US011023538B2

(12) United States Patent
Hildebrand et al.

(10) Patent No.: US 11,023,538 B2
(45) Date of Patent: *Jun. 1, 2021

(54) SYSTEM AND METHODS FOR DYNAMIC GENERATION OF OBJECT STORAGE DATASETS FROM EXISTING FILE DATASETS

(71) Applicant: International Business Machines Corporation, Armonk, NY (US)

(72) Inventors: Dean Hildebrand, Bellingham, WA (US); Simon Lorenz, Geisenheim (DE); William W. Owen, Tucson, AZ (US); Rainer Wolafka, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 1481 days.

This patent is subject to a terminal disclaimer.

(21) Appl. No.: 14/835,655

(22) Filed: Aug. 25, 2015

(65) Prior Publication Data
US 2017/0061006 A1    Mar. 2, 2017

(51) Int. Cl.
*G06F 16/90* (2019.01)
*G06F 16/951* (2019.01)
*H04L 29/08* (2006.01)

(52) U.S. Cl.
CPC ........ *G06F 16/951* (2019.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 5,832,527 | A * | 11/1998 | Kawaguchi | G06F 16/10 |
| 6,321,219 | B1 * | 11/2001 | Gainer | G06F 16/10 |
| 6,421,684 | B1 * | 7/2002 | Cabrera | G06F 3/0607 |
| | | | | 707/802 |
| 7,797,275 | B2 | 9/2010 | Lee et al. | |
| 7,921,268 | B2 | 4/2011 | Jakob | |
| 8,135,746 | B2 * | 3/2012 | Lanjewar | G06F 16/16 |
| | | | | 707/791 |

(Continued)

FOREIGN PATENT DOCUMENTS

EP    2154617 A1    2/2010

OTHER PUBLICATIONS

Devulapalli et al. "Integrating Parallel File Systems with Object-Based Storage Devices," Supercomputing Conference, Nov. 10-16, 2007, 10 pages.

(Continued)

*Primary Examiner* — Belix M Ortiz Ditren
(74) *Attorney, Agent, or Firm* — Zilka-Kotab, P.C.

(57) ABSTRACT

A computed-implemented method is provided for generating object storage datasets from file datasets. The computed-implemented method includes analyzing entries of a file system to identify a file and checking the file against at least one policy. In response to identifying a match between the file and the at least one policy, details of a container are updated. A symbolic link to the file is created to allow access of the file by an object-based client. Updating the details of the container includes updating a database such that the database identifies at least one of the created symbolic link and the details of the container.

22 Claims, 8 Drawing Sheets

(56) References Cited

U.S. PATENT DOCUMENTS

| | | | |
|---|---|---|---|
| 8,793,308 B2* | 7/2014 | Pirzada | G06F 3/061 |
| | | | 709/203 |
| 8,868,970 B2 | 10/2014 | Gold et al. | |
| 8,965,855 B1 | 2/2015 | Phansalkar | |
| 9,213,721 B1* | 12/2015 | Faibish | G06F 17/30221 |
| 2002/0147734 A1* | 10/2002 | Shoup | G06F 7/24 |
| 2004/0243544 A1* | 12/2004 | Hipp | G06F 9/4843 |
| 2010/0094847 A1 | 4/2010 | Malan et al. | |
| 2011/0035650 A1* | 2/2011 | Jardine-Skinner | |
| | | | G06F 17/30011 |
| | | | 715/205 |
| 2014/0172794 A1* | 6/2014 | Bartholoma | G06F 17/30575 |
| | | | 707/634 |
| 2014/0201177 A1* | 7/2014 | Suryanarayan | G06F 16/182 |
| | | | 707/705 |

OTHER PUBLICATIONS

Hildebrand et al., U.S. Appl. No. 17/210,244, filed Mar. 23, 2021.

* cited by examiner

SYSTEM AND METHODS FOR DYNAMIC GENERATION OF OBJECT STORAGE DATASETS FROM EXISTING FILE DATASETS

BACKGROUND

The present invention relates to object storage, and more specifically, this invention relates to concurrently accessing data via multiple object and files protocols while maintaining a single disk representation.

A large amount of data currently exists on servers that are accessed by a variety of clients over networks via Network-Attached Storage (NAS) protocols, such as Network File System (NFS) and Server Message Block (SMB).

It is becoming increasingly common to access data via object interfaces, such as the OpenStack Object Store project, also referred to as OpenStack Swift. Data access to object stores is typically web-based, such as via mobile devices or web browsers. Object-based clients expect the data in a certain file system layout.

In some environments, it may be necessary that the same data be accessed via both object and NAS protocols. However, object-based storage is addressed via "lookup" semantics (e.g., find a specific object), whereas file storage (e.g., a file system) is organized in a hierarchical fashion, which may utilize POSIX semantics to traverse a file system hierarchy until a file is found. As a result, data may be duplicated within a system to ensure that the data is accessible via both object and NAS protocols.

BRIEF SUMMARY

A computer-implemented method according to one embodiment includes analyzing entries of a file system to identify a file and checking the file against at least one policy. In response to identifying a match between the file and the at least one policy, details of a container are updated. A symbolic link to the file is created to allow access of the file by an object-based client. Updating the details of the container includes updating a database such that the database identifies at least one of the created symbolic link and the details of the container.

In another embodiment, a computer program product is provided for objectifying a file system. The computer program product comprises a computer readable storage medium having program instructions embodied therewith. The program instructions are executable by a processor to cause the processor to analyze entries of a file system to identify a file. Executing the program instructions further causes the processor to check the file against at least one policy. In response to identifying a match between the file and the at least one policy, the processor updates details of a container such that data of an object server points to the file and an object-based client is provided access to the file via the object server. Updating the details of the container includes updating a database such that the database identifies the details of the container.

In another embodiment, a computer program product is provided for dynamic reference generation. The computer program product comprises a computer readable storage medium having program instructions embodied therewith. The program instructions are executable by a processor to cause the processor to receive a request generated by an object-based client, where the request is received after being forwarded from an object server. Executing the program instructions further causes the processor to check the request against at least one policy, and, in response to identifying a match between the request and the at least one policy, update details of a container in the object server such that data of the object server points to a file of a file system, and the object-based client is provided access to the file via the object server. Updating the details of the container includes updating a database such that the database identifies the details of the container.

Other aspects and embodiments of the present invention will become apparent from the following detailed description, which, when taken in conjunction with the drawings, illustrate by way of example the principles of the invention.

DETAILED DESCRIPTION

Figure 1:
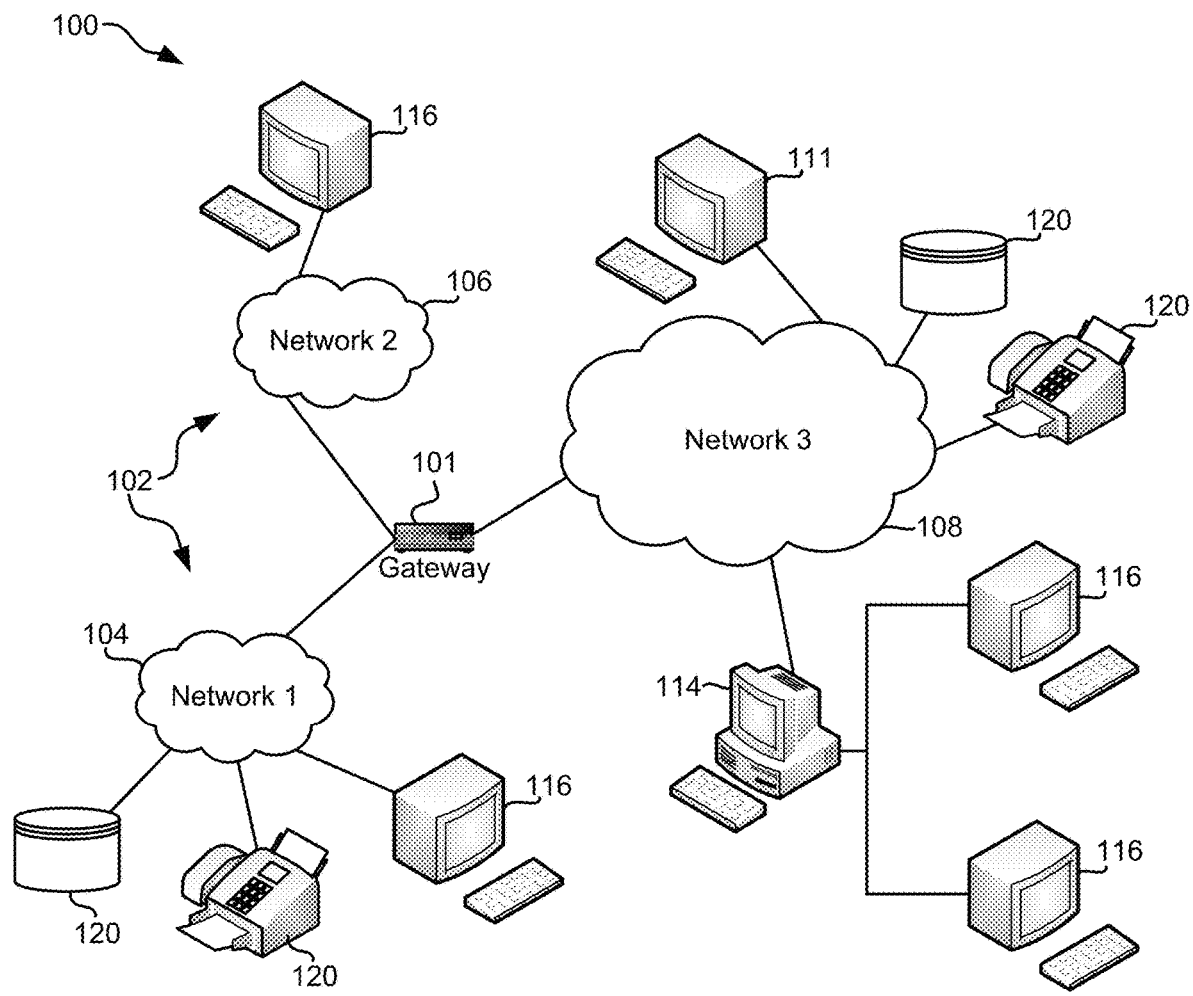
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for generation of object storage datasets from existing file datasets.

As noted above, in some environments, it may be necessary that the same data be accessed via both object and NAS protocols. However, because object-based storage is addressed via "lookup" semantics, and file storage is organized in a hierarchical fashion, data may be duplicated within a system to ensure that the data is accessible via both object and NAS protocols.

Various embodiments described herein provide, via an objectification engine, a solution for combining object-based storage and file-based storage while maintaining only a single disk representation of actual data. In this manner, the data in any arbitrary file system may be objectified without actually moving the data of the file system. This may ensure that the same data is accessible to both object-based clients and file-based clients. Further, the same data may be concurrently accessible to both object-based clients and file-based clients via multiple object and file protocols while maintaining the single representation of the data. Moreover, this may be space and resource efficient, as only one physical copy of the data may be required to exist.

In one general embodiment, a computed-implemented method includes analyzing entries of a file system to identify a file and checking the file against at least one policy. In response to identifying a match between the file and the at least one policy, details of a container are updated. A symbolic link to the file is created to allow access of the file by an object-based client. Updating the details of the container includes updating a database such that the database identifies at least one of the created symbolic link and the details of the container.

In another general embodiment, a computed-implemented method includes analyzing entries of a file system to identify a file. The computed-implemented method further includes checking the file against at least one policy. In response to identifying a match between the file and the at least one policy, details of a container are updated such that data of an object server points to the file and an object-based client is provided access to the file via the object server. Updating the details of the container includes updating a database such that the database identifies the details of the container.

In another general embodiment, a computed-implemented method includes receiving a request generated by an object-based client, where the request is received after being forwarded from an object server. The computed-implemented method includes checking the request against at least one policy, and, in response to identifying a match between the request and the at least one policy, updating details of a container in the object server such that data of the object server points to a file of a file system. The object-based client is provided access to the file via the object server. Updating the details of the container includes updating a database such that the database identifies the details of the container.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods, and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared Network resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
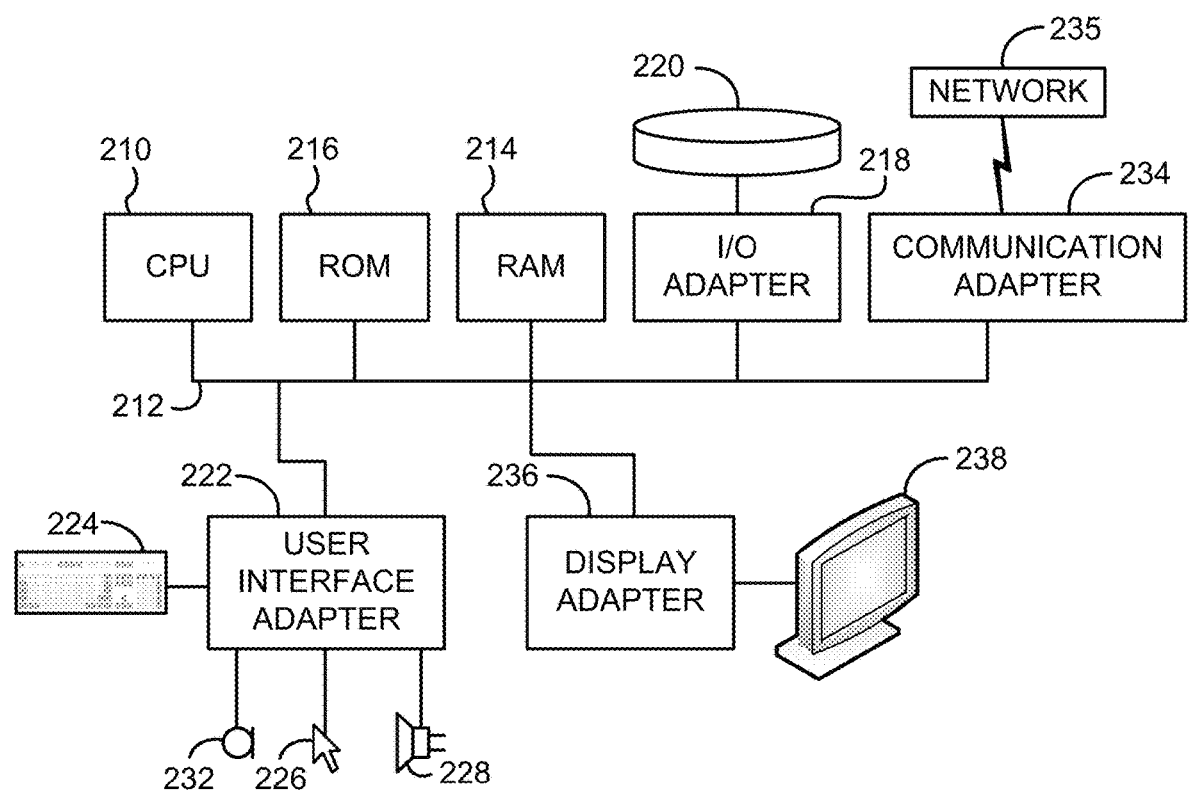
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using Python, XML, C, and/or C++ language, or other programming languages, along with an object oriented programming methodology. Object oriented programming (OOP), which has become increasingly used to develop complex applications, may be used.

Figure 3A:
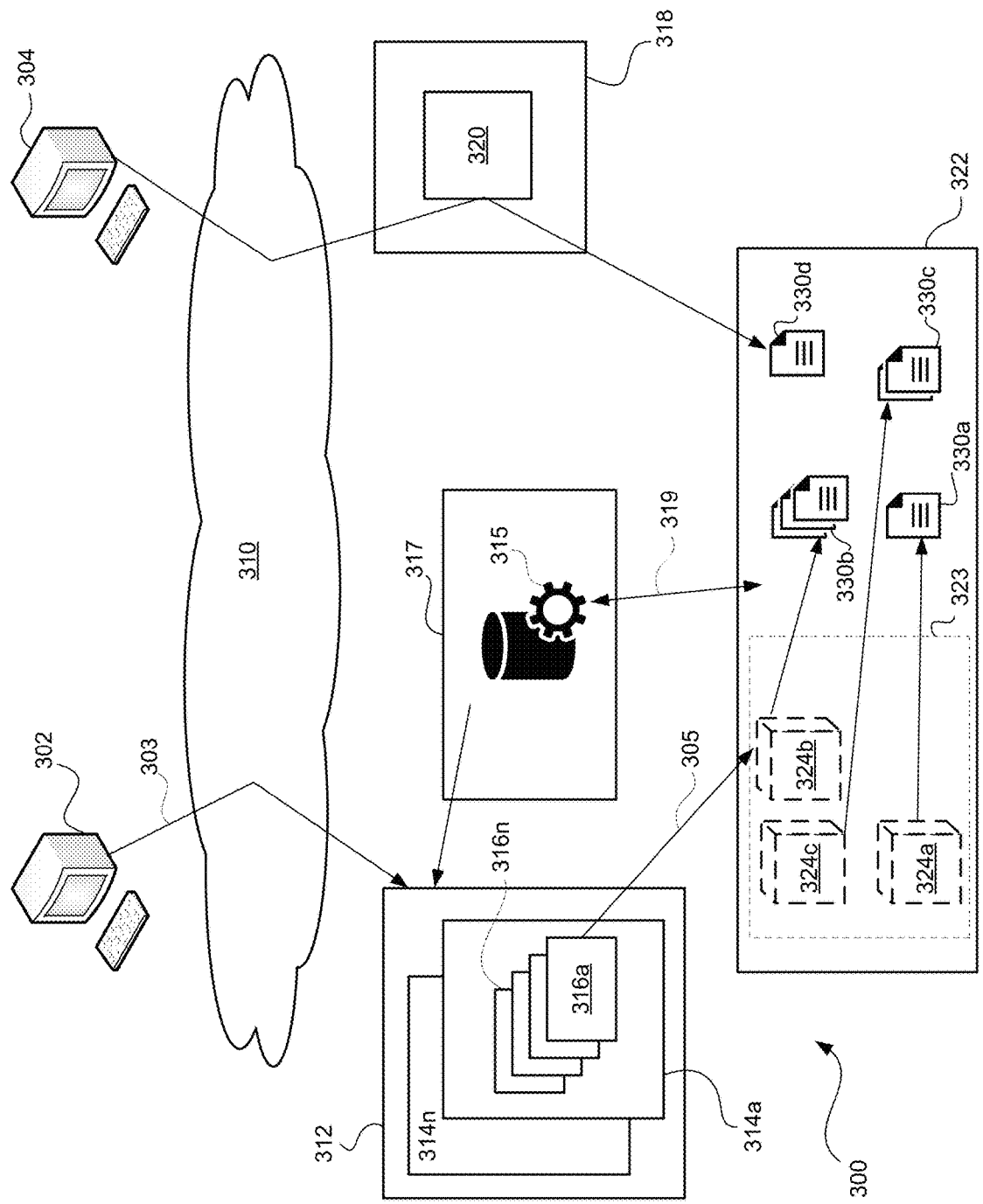
FIG. 3A illustrates a system for objectifying a file system utilizing symbolic links, in accordance with one embodiment.

FIG. 3A depicts a system 300 for objectifying a file system utilizing symbolic links, in accordance with one embodiment. As an option, the present system 300 may be implemented in conjunction with features from any other embodiment listed herein, such as those described with reference to the other FIGS. Of course, however, such system 300 and others presented herein may be used in various applications and/or in permutations which may or may not be specifically described in the illustrative embodiments listed herein. Further, the system 300 presented herein may be used in any desired environment.

As shown in FIG. 3A, the system 300 includes an object-based client 302, a file-based client 304, a network 310, an object server 312, an objectification engine 317, a file stack 318, and a file system 322.

As used herein, the file system 322 may comprise any entity that controls how data is stored and retrieved. The file system 322 may control data storage such that data is stored in a hierarchical structure including directories and subdirectories. Further, the file system 322 may provide a format for specifying paths to the stored data through a structure of the directories and subdirectories. The data stored in the file system 322 may comprise one or more files 330, such as the files 330a, 330b, 330c, and 330d depicted in FIG. 3A.

Accordingly, the file-based client 304 may include any device that accesses the data stored in the file system 322 utilizing the specified paths through the hierarchical structure of the file system 322. In one embodiment, the file-based client 304 may include any device that accesses the file system 322 over the network 310, such as the server 114, or the user devices 111 and 116 described within the context of FIG. 1.

Moreover, the network 310 may include any group of two or more devices linked together for communication. The network 310 may include one or more of the networks 104, 106, and 108 described in the context of FIG. 1. In one embodiment, the network 310 includes the Internet. Additionally, the file stack 318 comprises any entity that exports the file system 322 to the file-based client 304. Exporting the file system 322 may include any operation that enables devices, such as the file-based client 304, that are not directly connected to the file system 322 to view and manipulate data that is in the file system 322. The file stack 318 may export the file system 322 utilizing external services 320. The external services 320 may include network applications and protocols, such as Network File System (NFS), Server Message Block (SMB), iSCSI, etc., each of which may export the file system 322 for access by the file-based client 304. Accordingly, the file-based client 304 may access the files 330 of the file system 322 through the file stack 318. Further, the file-based client 304 may access the files 330 using network protocols such as NFS, SMB, etc.

Still yet, the object-based client 302 may include any device that access the file system 322 through the object server 312. In one embodiment, the object-based client 302 may include the data server 114, or the user devices 111 and 116, described within the context of FIG. 1. Additionally, the object server 312 may comprise any server that can store objects to, retrieve objects from, and/or delete objects from an object storage device.

In various embodiments, an object may be stored as a binary file with metadata stored in extended attributes for the binary file. Further, each object may be stored with one or more other objects within a container storage location, and each container storage location may be stored with one or more other container storage locations within an account storage location. Each account storage location may contain information about itself, and the container storage locations within the account storage location. Similarly, each container storage location may contain information about itself, and the objects stored within the container storage location. As described herein, each container storage location may be referred to as a "container," and each account storage location may be referred to herein as an "account."

As shown in FIG. 3A, the object server 312 includes a plurality of accounts 314, depicted as account 314a . . . 314n. Further, each of the accounts 314 includes one or more containers. As depicted in FIG. 3A, the account 314a is shown to include containers 316a . . . 316n.

In prior art systems, each of the containers may refer to storage locations for the objects stored in the container. In such systems, each of the objects may be physically stored in in a file system, such as the file system 322. Further, in such embodiments, the objects may be physically stored in a manner that is separate from file data stored in a hierarchical manner on the file system. Thus, the objects may be stored with a layout of: <Account><--><Container><--><Object>, where "<-->" indicates a reference between each entity.

The objectification engine 317 comprises any system that operates to scan 319 the file system 322, and the data within the file system 322, and enable sharing of the data, or a subset of the data, with the object-based client 302. For example, in one embodiment, the objectification engine 317 may scan the file system 322 and, based on policies 315, generate an object view of the file system 322 that emulates an objectified file system that is entirely different from the file system 322 available to the file-based client 304. This view of the objectified file system may then be made accessible via existing object interfaces of the object server 312.

As shown in FIG. 3A, the objectification engine 317 evaluates the policies 315, scans 319 the files 330 of the file system 322, and generates an object view of data in the file system 322 by creating symbolic links 324 in an object namespace 323 of the file system 322. The object-based client 302 may then access the object namespace 323 of the file system 322. In one embodiment, the object namespace 323 generated by the objectification engine 317 may comprise the entirety of an object store. In another embodiment, the object namespace 323 generated by the objectification engine 317 may extend an existing object namespace. In either embodiment, the symbolic links 324 may be transparent to the object-based client 302 and the object server 312.

In one embodiment, one or more ring files may determine where objects reside in the object namespace 323. Further, an extended attribute inside of a given object may define how data for the object is laid out on disk. In such an embodiment, the symbolic links 324 may be created using the same procedure as would be used for an object storing a file.

As shown in FIG. 3A, the object-based client 302 has sent a request 303 for an object to the object server 312. In response to receiving the request 303 for an object from the object-based client 302, the object server 312 parses the request 303, and searches for the object utilizing a ring file.

Based on the ring file, the object server 312 may identify a location for the requested object in the object namespace 323. In one embodiment, the object server 312 may identify where data for the requested object is located on a disk. The object server 312 then attempts to access 305 the data of the requested object, but instead transparently accesses a symbolic link 324. In other words, utilizing a ring file, a location of a symbolic link 324 may be transparently identified and accessed by the object server 312.

Transparent to the object server 312 and the object-based client 302, the data of the requested object is actually a symbolic link 324 to a file that exists within a non-object namespace of the file system 322. As shown, the attempted access 305 of the data of the requested object results in an access of the symbolic link 324b, which is a symbolic link to the file 330b, and the object-based client 302 is returned the file 330b from within the file system 322 via the object server 312 in response to the request 303. Similarly, if the object-based client 302 has requested an object stored as the symbolic link 324a, the object-based client 302 would be provided the file 330a from within the file system 322 via the object server 312 in response to the request. Accordingly, although the object server 312 and the object-based client 302 believe that an object is being served, a file 330 from file-based storage is being accessed by the object server 312, where the file 330 is the target of a symbolic link 324. Thus, in one embodiment, each of the symbolic links 324 may appear to the object-based client 302 as an object of the container 316a in an object namespace.

Still yet, the system 300 may allow the object-based client 302 to create an object in the object namespace 323 of the file system 322. In one embodiment, the object-based client 302 may create an object by sending a "PUT" request to the object server 312. Because of the logical view utilized by the object-based client 302, the actual data of the create request may be stored somewhere in the file system 322. The location of where the data is stored may be based on a prior mapping that is performed based on a scan of the file system 322 by the objectification engine 317.

For example, in one embodiment, in response to the object-based client 302 creating a new object within the object namespace 323, the objectification engine 317 may copy the data of the new object to a physical location in the file system 322, and update a view of the object namespace 323 such that the data is represented logically as an object. In this manner, the object-based client 302 may create new data that is accessible by other object-based clients and the file-based client 304, provided that no policy prevents access of the new data by such other clients.

Figure 3B:
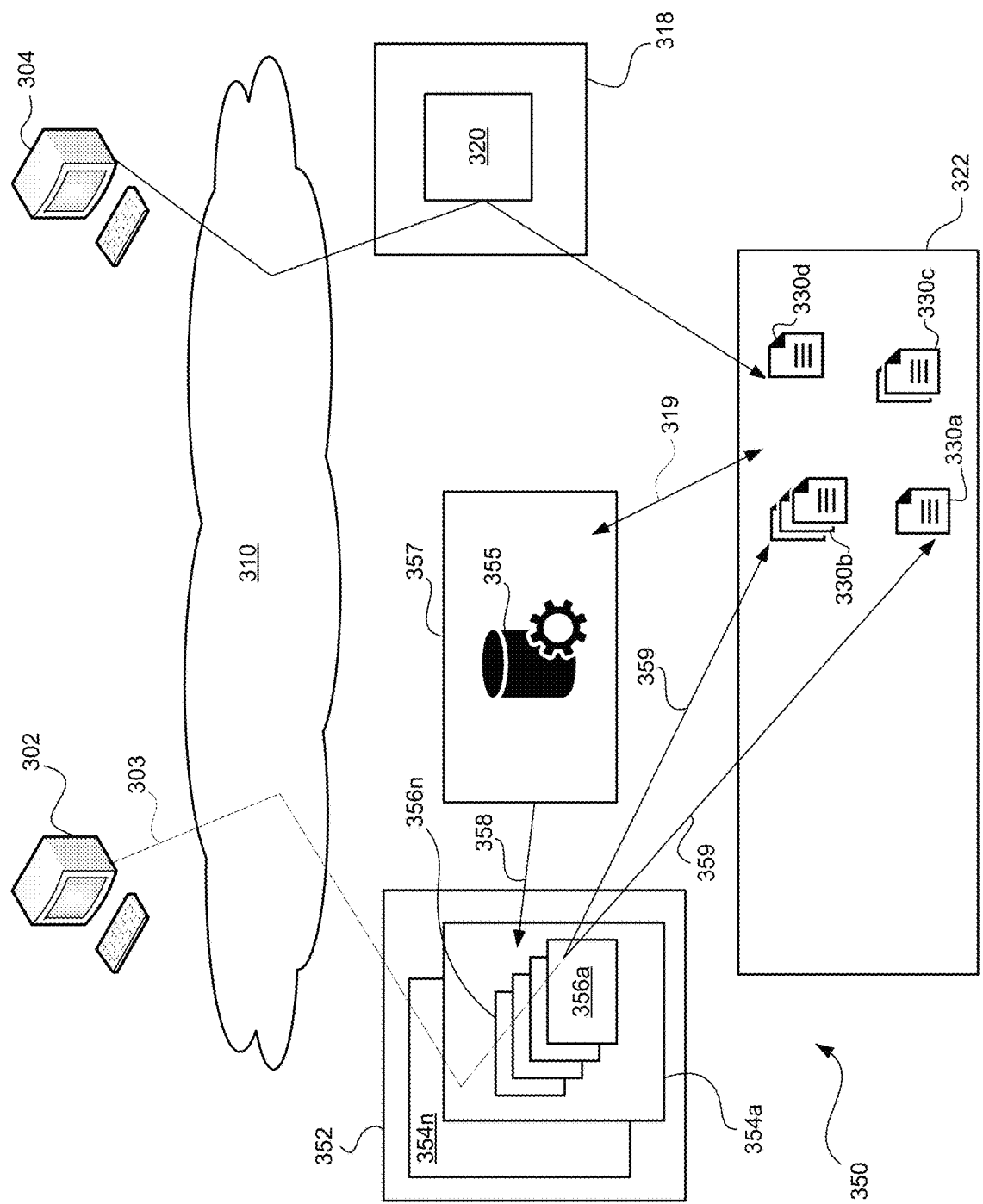
FIG. 3B illustrates a system for objectifying a file system utilizing direct reference manipulation, in accordance with another embodiment.

FIG. 3B depicts a system 350 for objectifying a file system utilizing direct reference manipulation, in accordance with one embodiment. As an option, the present system 350 may be implemented in conjunction with features from any other embodiment listed herein, such as those described with reference to the other FIGS. Of course, however, such system 350 and others presented herein may be used in various applications and/or in permutations which may or may not be specifically described in the illustrative embodiments listed herein. Further, the system 350 presented herein may be used in any desired environment.

As shown in FIG. 3B, the system 350 includes an object-based client 302, a file-based client 304, a network 310, an object server 352, an objectification engine 357, a file stack 318, and a file system 322. The object-based client 302, the file system 322, the file-based client 304, the network 310, and the file stack 318 of FIG. 3B may operate substantially identical to the object-based client 302, the file system 322, the file-based client 304, the network 310, and the file stack 318, respectively, described in the context of FIG. 3A.

As shown in FIG. 3B, the object server 352 includes a plurality of accounts 354, depicted as accounts 354a . . . 354n. Further, each of the accounts 354 may include one or more containers. As depicted in FIG. 3B, the account 354a is shown to include containers 356a . . . 356n.

The objectification engine 357 comprises any system that operates to scan 319 the file system 322, and the data within the file system 322, and enable sharing of the data, or a subset of the data, as objects to the object-based client 302. For example, in one embodiment, the objectification engine 357 may scan 319 the file system 322 and generate, based on policies 355, an objectified view of the files 330 of the file system 322. Still yet, the objectification engine 357 generates the objectified view of the files 330 by directly manipulating 358 object-to-file references in the object server 352. This view of the objectified file system may then be made accessible via existing object interfaces of the object server 352. In this way, the objectification engine 357 may manipulate how an object store of the object server 352 searches for data on a disk, and directly points the object server 352 to the data on a disk. In other words, the object-based client 302 may be directed, by the manipulated object-to-file references, to an object representation on a disk.

In various embodiments, the objectification engine 357 may translate the container-object space of the object server 352 to a mapping that enables access 359 by the object-based client 302 of the files 330 stored in the file system 322. Still yet, in such embodiments, the mapping may be constructed based on the policies 355.

The direct manipulation of object-to-file references by the objectification engine 357 may obviate the use of ring files by the object server 352 for locating where objects reside. Accordingly, in response to a request 303 from the object-based client 302, the object server 352 may provide the object-based client 302 access to object data without referencing a ring file. More specifically, in response to the request 303 from the object-based client 302, the object server 352 may provide the object-based client 302 the files 330a and 330b without referencing a ring file to identify a physical location of data that would otherwise be in an object identified in the request 303.

In one embodiment, the objectification engine 357 may routinely scan 319 and catalog the data of the file system 322. Further, after scanning 319 the file system 322, the objectification engine 357 may provide the object server 352 with a mapping of container-object space to locations for directly accessing the data stored in the file system 322. Using the mappings of container-object space to locations for directly accessing the data stored in the file system 322, the object server 352 may provide the object-based client 302 access to the files 330.

As shown, in FIG. 3B, the object server 352 is providing the object-based client 302 direct access 359 to the files 330a and 330b using mappings of container-object space to locations of the files 330a and 330b. Of course, the object server 352 may limit access of the object-based client 302 to data of the file system 322 in a manner that does not violate any account/container/object access policies of the object server 352.

In various embodiments, the files 330 may be provided to the object-based client 302 based on the policies 355. For example, based on the objectification engine 357 previously scanning the file system 322 in view of the policies 355, the objectification engine 357 may have generated a list of files determined to reside in the file system 322. Thereafter, any direct manipulation 358 of object-to-file references in the object server 352 based on the generated list would be in accordance with the policies 355. Accordingly, in one embodiment, the objectification engine 357 may enable the object server 352 to provide the object-based client 302 with direct access to the files 330 in accordance with various access policies.

Still yet, the system 350 may allow the object-based client 302 to create an object in the file system 322. In one embodiment, the object-based client 302 may create an object by sending a HTTP "PUT" request to the object server 352. Because of the logical view utilized by the object-based client 302, the actual data of the create request may be put somewhere in the file system 322. The location of where the data is put may be based on a prior mapping that was created based on a scan performed by the objectification engine 357.

In one embodiment, the object-based client 302 may create a new object for storage in the file system 322. In response to the object-based client 302 creating the new object, the object server 352 may copy the data of the new object to a physical location in the file system 322, and update container-object space mappings stored in the object server 352. An objectified view of the file system 322 may be updated concurrently with, or in response to, the update of the mapping stored in the object server 352. In this manner, the object-based client 302 may create new data that is accessible by other object-based clients and the file-based client 304, provided that no policy prevents access of the new data by such other clients.

Figure 3C:
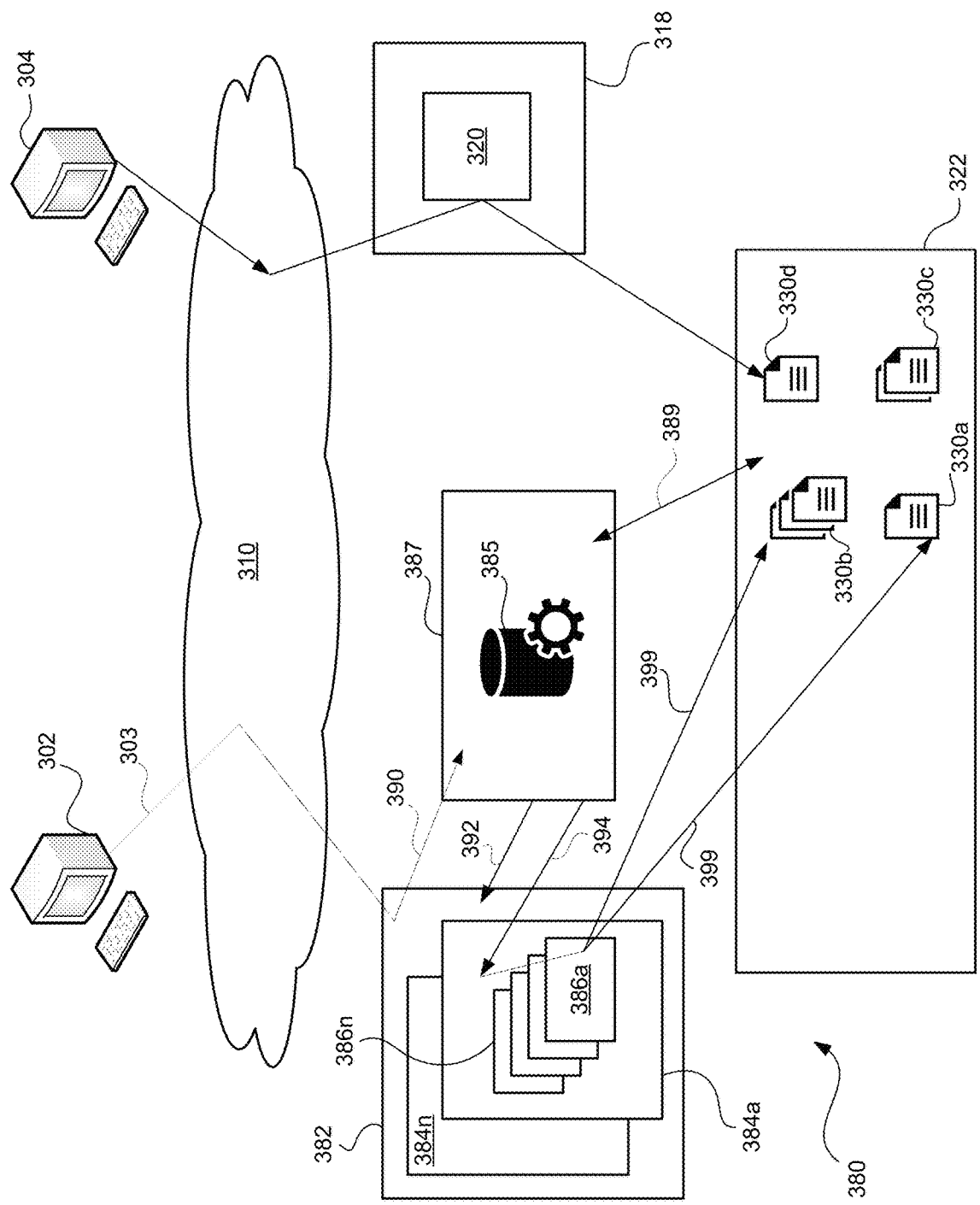
FIG. 3C illustrates a system for objectifying a file system utilizing direct reference manipulation, in accordance with an embodiment.

FIG. 3C depicts a system 380 for objectifying a file system utilizing direct reference manipulation, in accordance with another embodiment. As an option, the present system 380 may be implemented in conjunction with features from any other embodiment listed herein, such as those described with reference to the other FIGS. Of course, however, such system 380 and others presented herein may be used in various applications and/or in permutations which may or may not be specifically described in the illustrative embodiments listed herein. Further, the system 380 presented herein may be used in any desired environment.

As shown in FIG. 3C, the system 380 includes an object-based client 302, a file-based client 304, a network 310, an object server 382, an objectification engine 387, a file stack 318, and a file system 322. The object-based client 302, the file system 322, the file-based client 304, the network 310, and the file stack 318 of FIG. 3C may operate substantially identical to the object-based client 302, the file system 322, the file-based client 304, the network 310, and the file stack 318, respectively, described in the context of FIG. 3A.

As shown in FIG. 3C, the object server 382 includes a plurality of accounts 384, depicted as account 384a . . . 384n. Further, each of the accounts 384 may include one or more containers. As depicted in FIG. 3C, the account 384a is shown to include containers 386a . . . 386n.

The objectification engine 387 comprises any system that operates to scan 389 the file system 322, and the data within the file system 322, and enable sharing of the data, or a subset of the data, as objects to the object-based client 302. For example, in one embodiment, the objectification engine 387 may scan 389 the file system 322 and generate, based on policies 385, an objectified view of the files 330 of the file system 322. Still yet, the objectification engine 387 generates the objectified view of the files 330 by directly manipulating object-to-file references in the object server 382. This view of the objectified file system may then be made accessible via existing object interfaces of the object server 382. In this way, the objectification engine 387 may manipulate how an object store of the object server 382 searches for data on a disk, and directly points the object server 382 to the data on a disk. In other words, the object-based client 302 may be directed, by the manipulated object-to-file references, to an object representation on a disk.

In various embodiments, the objectification engine 387 may translate the container-object space of the object server 382 to a mapping that enables access 399 by the object-based client 302 of the files 330 stored in the file system 322. Still yet, in such embodiments, the mapping may be constructed based on the policies 385.

The direct manipulation of object-to-file references by the objectification engine 387 may obviate the use of ring files for locating where objects reside. Accordingly, in response to a request 303 from the object-based client 302, the object server 382 may provide the object-based client 302 access to object data without referencing a ring file. More specifically, in response to the request 303 from the object-based client 302, the object server 382 may provide the object-based client 302 the files 330a and 330b without referencing a ring file to identify a physical location of data that would otherwise be in an object identified in the request 303.

In one embodiment, the files 330 may be provided to the object-based client 302 based on the policies 385. In such an embodiment, the objectification engine 387 may be forwarded 390, by the object server 382, the request 303 from the object-based client 302. In response, the objectification engine 387 may determine attributes of the object-based client 302 and the request 303. For example, the objectification engine 387 may detect a location, a workgroup, an account of the object-based client 302, and/or the objectification engine 387 may detect a contents, type, etc. of the request 303.

In response to the request 303, and based on the attributes of the object-based client 302 and the request 303, as well as policies 385, the objectification engine 387 may scan 389 the file system 322, and build a list of files that may be provided to the object-based client 302. The list of files may then be provided 392 to the object server 382. The list of files provided 392 to the object server 382 may identify a subset of the files 330 stored in the file system 322. Further, the objectification engine 387 may provide 394 to the object server 382 locations of where the subset of the files 330 may be accessed for the object-based client 302.

Still yet, using the list of files and the locations of where the subset of files 330 may be accessed, the object server 382 may provide the object-based client 302 access to the files 330. As shown in FIG. 3C, the object-based client 302 is provided access to the files 330a and 330b through a mapping of container-object space to locations for directly accessing the data stored in the file system 322. Using the mappings of container-object space to locations for directly accessing the data stored in the file system 322, the object server 382 may provide the object-based client 302 access to the files 330.

As shown, in FIG. 3C, the object server 382 is providing the object-based client 302 direct access 399 to the files 330a and 330b using mappings of container-object space to locations of the files 330a and 330b. Further, such mappings were generated dynamically, in response to the request 303, and based on the policies 385. In this manner, based on checking the request 303 against the policies 385, and dynamically updating details of a container in the object server 382 based on the checking, an objectified view of the file system 322 may be generated in response to the request 303 from the object-based client 302.

Of course, using the policies 385, access of the object-based client 302 to data of the file system 322 may be provided (and limited) in a manner that does not violate any account/container/object access policies of the object server 382.

Still yet, the system 380 may allow the object-based client 302 to create an object in the file system 322. In one embodiment, the object-based client 302 may create an object by sending a HTTP "PUT" request. Because of the logical view utilized by the object-based client 302, the actual data of the create request may be put somewhere in the file system 322. The location of where the data is put may be based on a dynamic mapping performed by the objectification engine 387.

In one embodiment, the object-based client 302 may create a new object for storage in the file system 322. The objectification engine 387 may be forwarded, from the object server 382, a request of the object-based client 302 to create the new object within an object namespace. In response to the request to create the new object, the objectification engine 387 may copy the data of the object to a physical location in the file system 322. In response to subsequent requests from object-based clients, container-object space mappings may be generated that identify a physical location of data of the new object such that the object may be accessed by the object-based clients as if the object was stored in an object namespace. In this manner, the object-based client 302 may create new data that is accessible by other object-based clients and the file-based client 304, provided that no policy prevents access of the new data by such other clients.

The policies 315, 355, and 385 may be configured in a multiplicity of different manners. For example, the policies may be configured to read and evaluate metadata such as access control lists (ACLs), file type, file size, time stamps, and user defined attributes, such as extended file system attributes. Still yet, data may be published or objectified by an objectification engine based on metadata keys and values.

In one embodiment, the policies may be configured to provide an object-based client only files that are not older than a previously determined time period. For example, the policies may be configured to provide the object-based client only files that were created in the past year, are less than 10 days old, are less than 7 days old, etc.

In another embodiment, the policies may be configured to provide an object-based client only files that are of a specific file type. For example, the policies may be configured to provide the object-based client only files that are of a PDF file type, DOC file type, or JPG file type, etc.

In yet another embodiment, the policies may be configured to provide an object-based client only files that are below a threshold size, above a threshold size, or within a size range. For example, the policies may be configured to provide the object-based client only files that are less than 100 KB in size, only files that are greater than 1 MB in size, or only files that are between 10 MB and 100 MB in size.

Additionally, any of the above-noted policies may be combined to provide greater control in exposing files of a file system to the object-based clients. For example, it may be desirable to only provide the object-based clients with access to PDF files that were created in the past 7 days, and are less than 1 MB in size. In this way, object-based clients may be provided limited access to only a subset of the files that are maintained on the file system. Such policies may be utilized to objectify only a particular subset of data stored on a given file system.

In some embodiments, a file attribute of a native file system, such as, for example, a "group" identifier, may be mapped into the object-based access environment. For example, the group identifier may be mapped into the object-based access environment as an account (e.g., one of account 314a, 354a, 384a, etc.). In this manner, only an object-based client that is a member of a permitted account may be provided access to files that are associated with or owned by a group of the native file system.

The above-noted policies may allow fine-grained control for limiting access of object-based clients to data on an arbitrary file system. By limiting which files are exposed by an object interface, security of the file system may be ensured. Further, browser-based and mobile device-based clients may be provided with object access to files as they are created natively within a file system.

Accordingly, an object-based architecture and a file-based architecture may be joined such that object-based and file-based clients may access the same data in an arbitrary file system. In the various embodiments, an objectification engine may scan the file system, and, according to policies, create one or more objectified views for the file system without modifying the data stored on the file system. As noted, the objectified views may be static, such as those based on static file attributes, such as file type. Additionally, the objectified view may be dynamic, such as those based on attributes of creation time, current date/time, and client location.

Still yet, regardless of whether an objectification engine provides symbolic links of a file system to object-based clients, or instead provides access to the file system utilizing direct reference manipulation, the access to the file system may be provided in either a static or dynamic manner.

In various embodiments that provide dynamic generation of an object view, the object view may be generated or updated at the time a client request is received by the object server. In this manner, the object view may always be current, and may be tailored for each individual client request based on policies. For example, generation of the object view may account for the client's location, operating system, device, source Internet Protocol (IP) address, network route, local time zone, etc. However, since the object view is generated or updated in response to the client request, the processing load on the object server and the objectification engine may be increased. As a result of the increase of the processing load, response time may be increased.

In some embodiments that provide static generation of an object view, the object view may be generated in a static fashion that is triggered by one or more predetermined events, or by a background process that periodically evaluates the policies of the objectification engine. For example, the objectification engine may generate every day at midnight a new object view of the file system. Because the generation of the object view is done asynchronously, and is not done in response to client requests, there may be no impact on client response time. However, because the object view is not always current, the objectification of the file system may not reflect the latest changes made to files on the file system, such as changes made by file-based clients. In such embodiments, a configuration of a scan interval and other event handling may correlate to how recent changes made to the file system by file-based clients are presented to the object-based clients.

In still other embodiments, an object view may be generated by an objectification engine utilizing a mix of the static generation and dynamic generation approaches. In one embodiment, a particular subset of the file system may be configured for dynamic generation of the object view, while another subset of the file system is configured for static generation of the object view. For example, the objectification engine may be configured to dynamically generate an object view for a directory on the file system that is frequently updated by the file-based clients, while statically generating an object view for a directory that stores infrequently updated files. As another example, the objectification engine may be configured to provide a statically generated object view in response to a request to view all files of a specific file type, but to provide a dynamically generated object view in response to a request for files that are greater than a certain size.

In another embodiment, the objectification engine may be configured to select between dynamic and static generation of the object view based upon system metrics, such as load and health. For example, the objectification engine may be configured to dynamically generate an object view of the file system when system load is low or the system is healthy, and may be configured to provide a static generation of an object view when system load is above a threshold, or the health of the system has been determined to be below a threshold.

Figure 4A:
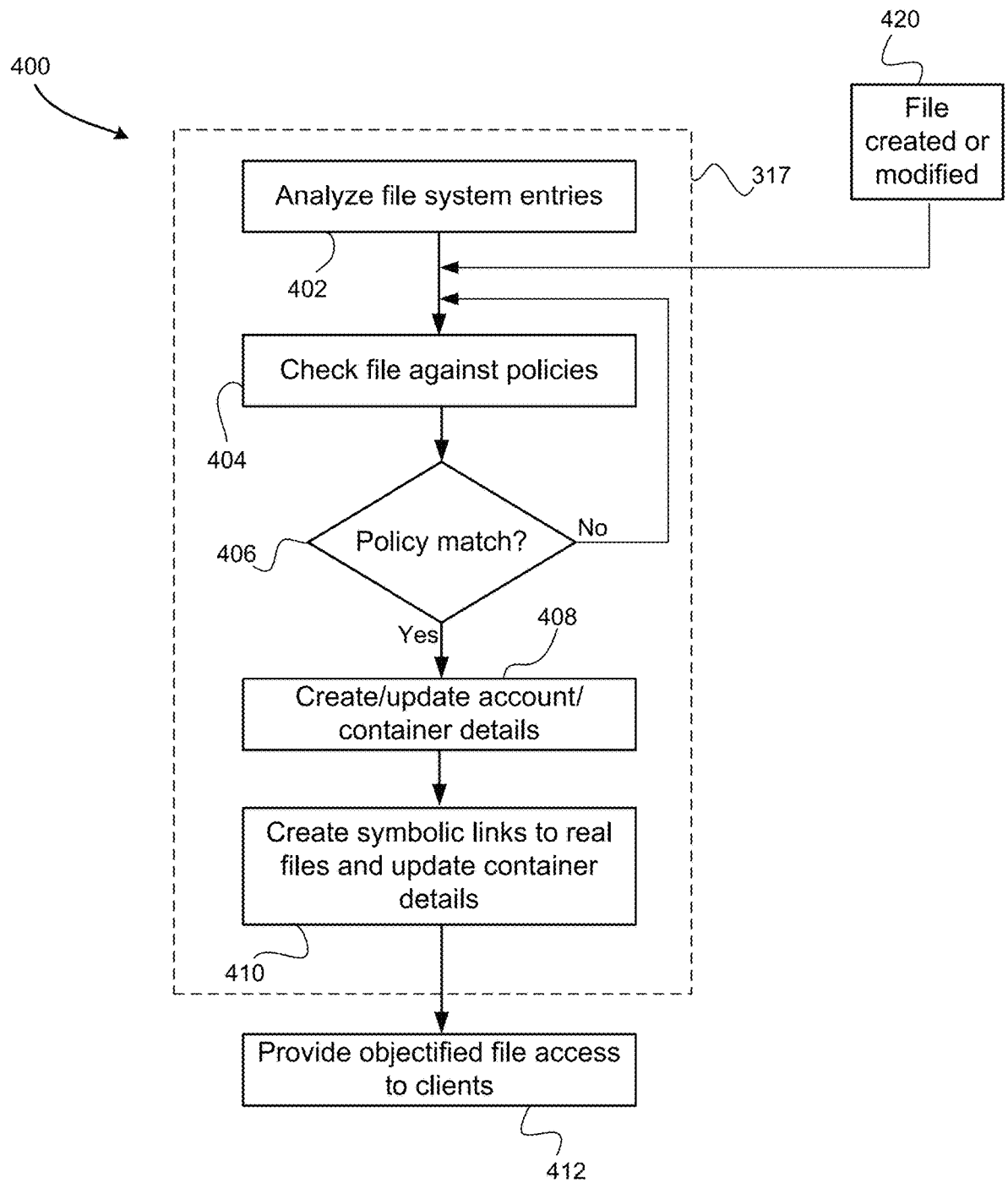
FIG. 4A illustrates a computed-implemented method for objectifying a file system, in accordance with one embodiment.

Now referring to FIG. 4A, a flowchart of a computed-implemented method 400 for objectifying a file system is shown according to one embodiment. The method 400 may be performed in accordance with the present invention in the environment depicted in FIG. 3A, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, in various embodiments, the method 400 may be partially or entirely performed by an objectification engine, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, file system entries are analyzed at operation 402. The file system entries may include any data stored in the file system. In one embodiment, the file system entries may include data in the form of user and/or system files. Further, analyzing the file system entries may include any operation that determines attributes of the data. For example, the analyzing may include determining, for one or more files, user or group ownership, access control limitations, file type, file size, time stamps, user-defined attributes, and extended file system attributes. In one embodiment, the files may be analyzed using file metadata.

Further, at operation 404, a file is checked against policies. A policy may include any rule or statement that is configured to control access of an object-based client to one or more files based on attributes of the client and the file. If it is determined, at operation 406, that there is no match between the file and the policies, then the method may return to operation 404 to check a next file against the policies.

However, if it is determined at operation 406 that the file does match one or more of the policies, then account and/or container details are created and/or updated at operation 408.

As noted above, an object storage system stores each object in a container, and each container is stored within an account. Thus, based on the file matching the one or more policies, an account and/or container may be created and/or updated in an object namespace that stores object-based representations of files. In this manner, an account storage object and/or container storage object may be created or updated in response to a file of the file system matching a previously determined policy.

Additionally, after creating or updating account and/or container details, one or more symbolic links to one or more real files are created at operation 410. Creating a symbolic link may include creating a representation of an object that links to the file checked against policies at operation 404. As shown in FIG. 4A, each of the operations 402-410 of the method 400 are performed by the objectification engine 317, described within the context of FIG. 3A.

In one embodiment, updating the details of the container includes updating a database such that the database identifies a newly created symbolic link and/or the details of the container. The database may include an index or a list. Further, the database may be an account database, or the database may be a container database. By updating the database, the newly created symbolic link and/or container details may be returned if a container and/or object listing is requested.

Still yet, at operation 412, objectified access is provided to clients. The clients may include any device that attempts to access the file system over a network utilizing an object storage application programming interface (API). For example, the clients may access data of the file system, over the Internet, as objects stored in containers.

Moreover, at operation 420, a file is created or modified. In response to the file being created or modified, the file is checked against policies at operation 404. As described above, if the created file matches one or more of the policies, then account and/or container details are created and/or updated, and one or more symbolic links to the file are created at operations 404-410. Further, objectified file access is provided to the created file by exposing the one or more symbolic links to object-based clients.

In view of the above, the computed-implemented method 400 may provide a way to introduce data to an object server without changing the architecture of the object server and how objects are presented to the object server. Accordingly, the object server may continue to utilize a data structure, such as a ring file, to determine how to identify an account, container, and object in response to a client request. Further, the object server may continue to resolve the location of data expected to be found in a requested object utilizing such a data structure. However, instead of accessing objects, the object server may be directed to files utilizing symbolic links that identify the files.

Figure 4B:
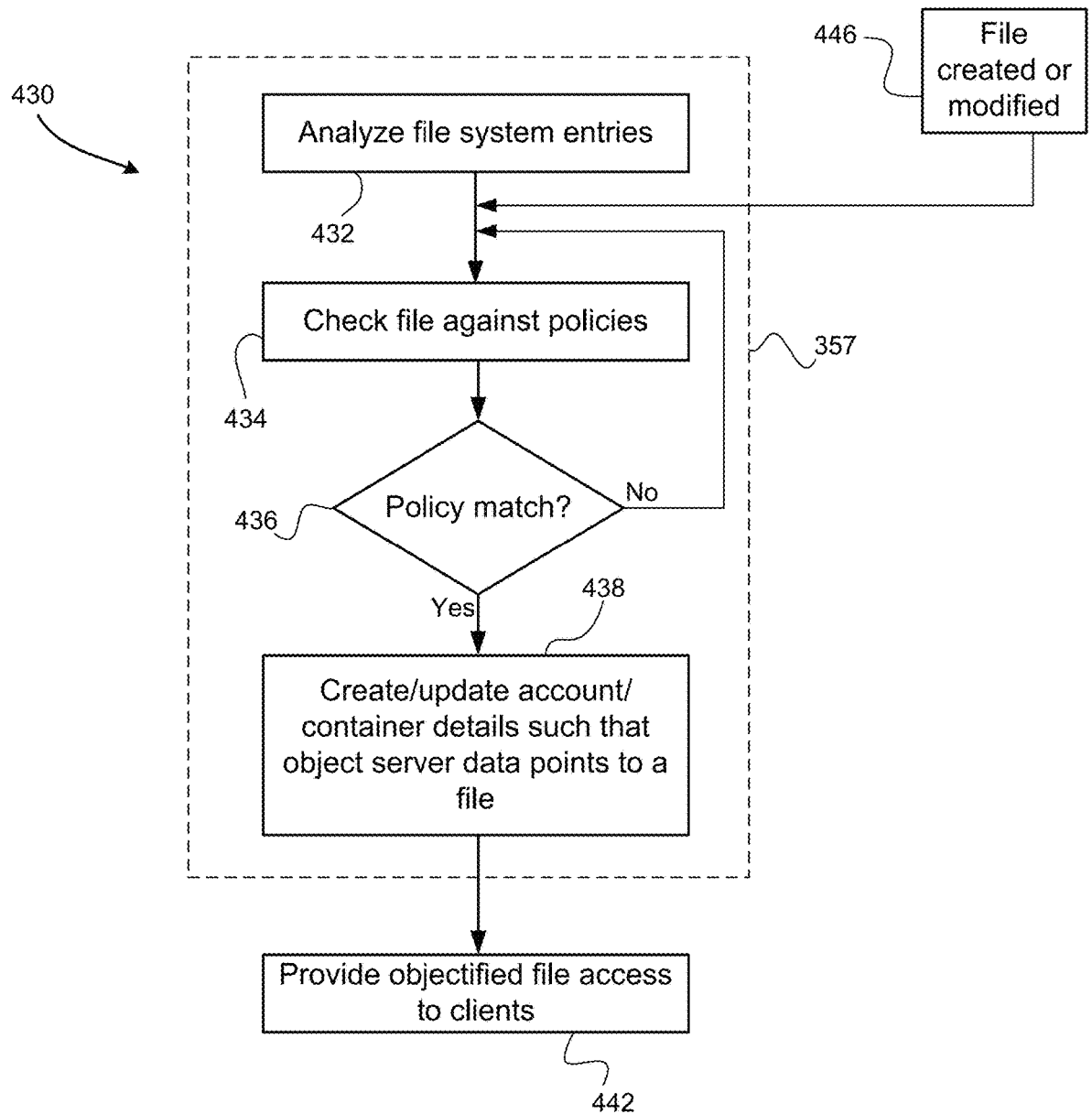
FIG. 4B illustrates a computed-implemented method for objectifying a file system, in accordance with another embodiment.

Now referring to FIG. 4B, a flowchart of a computed-implemented method 430 for objectifying a file system is shown according to one embodiment. The method 430 may be performed in accordance with the present invention in the environment depicted in FIG. 3B, among others, in various embodiments. Of course, more or less operations than those specifically described in FIG. 4B may be included in method 430, as would be understood by one of skill in the art upon reading the present descriptions.

Each of the steps of the method 430 may be performed by any suitable component of the operating environment. For example, in various embodiments, the method 430 may be partially or entirely performed by an objectification engine, or some other device having one or more processors therein.

The processor, e.g., processing circuit(s), chip(s), and/or module(s) implemented in hardware and/or software, and preferably having at least one hardware component may be utilized in any device to perform one or more steps of the method 430. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4B, file system entries are analyzed at operation 432. The file system entries may include any data stored in the file system. In one embodiment, the file system entries may include data in the form of user and/or system files. Further, analyzing the file system entries may include any operation that determines attributes of the data. For example, the analyzing may include determining, for one or more files, user or group ownership, access control limitations, file type, file size, time stamps, user-defined attributes, and extended file system attributes. In one embodiment, the files may be analyzed using file metadata.

Further, at operation 434, a file is checked against policies. A policy may include any rule or statement that is configured to control access of an object-based client to one or more files based on attributes of the client and the file. If it is determined, at operation 436, that there is no match between the file and the policies, then the method may return to operation 434 to check a next file against the policies.

However, if it is determined at operation 436 that the file does match one or more of the policies, then, at operation 438, account and/or container details are created and/or updated such that object server data points to a file.

In one embodiment, updating the details of the container includes updating a database such that the database identifies the details of the container. The database may include an index or a list. Further, the database may be an account database, or the database may be a container database. By updating the database, the container details may be returned if a container and/or object listing is requested.

The object server data may point to the file by way of a file path and/or file name. Further, the object server data may point to the file by a mapping of container-object space to locations for directly accessing the data of the file stored in the file system. As noted above, an object storage system stores each object in a container, and each container is stored within an account. Thus, based on the file matching the one or more policies, a container may be created and/or updated to point directly to a file path and file name. In this manner, an account storage object and/or container storage object may be created or updated in response to a file of the file system matching a previously determined policy. Further still, the object server may locate data stored in a file system without using a ring file.

As shown in FIG. 4B, each of the operations 432-438 of the method 430 are performed by the objectification engine 357, described within the context of FIG. 3B.

Additionally, at operation 442, objectified access is provided to clients. The clients may include any device that attempts to access the file system over a network utilizing an object storage application programming interface (API). For example, the clients may access data of the file system, over the Internet, as objects stored in containers.

Moreover, at operation 446, a file is created or modified. In response to the file being created or modified, the file is checked against policies at operation 434. As described above, if the created file matches one or more of the policies, then account and/or container details are created and/or updated such that object server data points directly to a file path and file name, at operations 434-438. The object server data may point to the file by a mapping of container-object space to locations for directly accessing the data of the file stored in the file system. Further, objectified file access is provided such that object-based clients are able to access the newly created file.

Figure 4C:
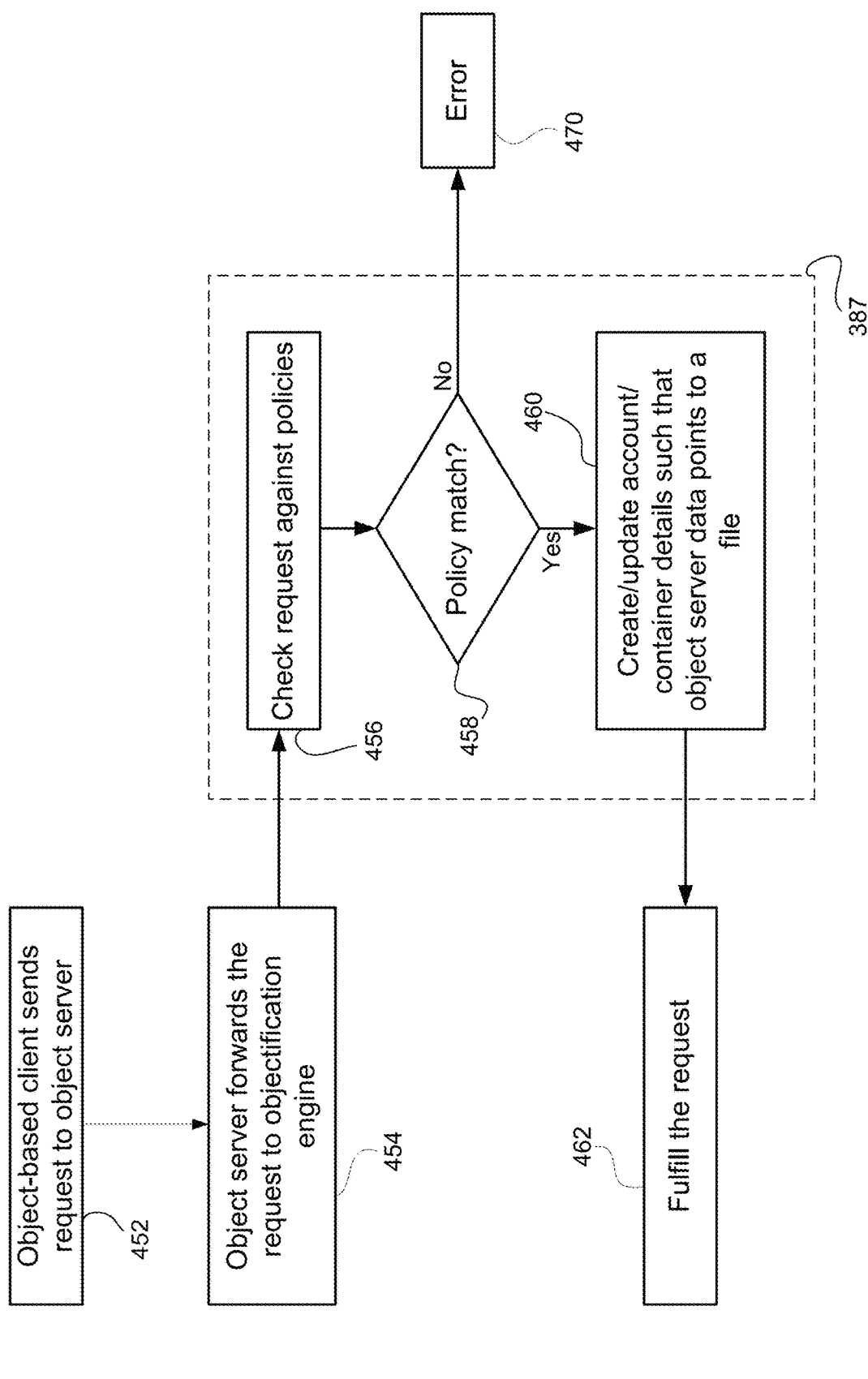
FIG. 4C illustrates a computed-implemented method for dynamic reference generation, in accordance with an embodiment.

Now referring to FIG. 4C, a flowchart of a computed-implemented method 450 for dynamic reference generation is shown according to one embodiment. The method 450 may be performed in accordance with the present invention in the environment depicted in FIG. 3C, among others, in various embodiments. Of course, more or less operations than those specifically described in FIG. 4C may be included in method 450, as would be understood by one of skill in the art upon reading the present descriptions.

Each of the steps of the method 450 may be performed by any suitable component of the operating environment. For example, in various embodiments, the method 450 may be partially or entirely performed by an objectification engine, or some other device having one or more processors therein. The processor, e.g., processing circuit(s), chip(s), and/or module(s) implemented in hardware and/or software, and preferably having at least one hardware component may be utilized in any device to perform one or more steps of the method 450. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4C, an object-based client sends a request to an object server at operation 452. The request may include a request to access one or more resources, such as objects. In one embodiment, the request may include an HTTP GET request. For example, the request may include a GET request for an object that is accessible via an object storage API.

The object-based client may include the object-based client 302, and the request may include the request 303, both of which have been described within the context of FIGS. 3A-3C. Further, the object server may include the object server 382, described in the context of FIG. 3C. Accordingly, the object server receives the request from the object-based client, and, at operation 454, forwards the request to an objectification engine, such as the objectification engine 387, which was previously described in the context of FIG. 3C.

Further, at operation 456, the objectification engine 387 checks the request against policies. A policy may include any rule or statement that is configured to control access of an object-based client to one or more files based on attributes of the client and the file. If it is determined, at operation 458, that there is no match between the request and the policies, then the method 450 may return an error at operation 470. In one embodiment, the error may be returned at operation 470 when the object-based client does not have access to the requested resource. For example, the object-based client may not be authenticated to access the account or container storing an object identified in the request.

In another embodiment, the error may be returned at operation 470 when the object-based client has requested a resource that does not exist. For example, the object-based client may have requested a list of PDF-type objects created in the last 24 hours, and, based on a scan of a file system, the objectification engine 387 has determined that no PDF-type objects have been created in the last 24 hours.

If, however, at operation 458 it is determined that there is a policy match, such that the requested resource exists and the object-based client is allowed to access the resource, then, at operation 460, account and/or container details are created and/or updated such that object server data points to a file. The object server data may point to the file by way of a file path and/or file name. Further, the object server data may point to the file by a mapping of container-object space to locations for directly accessing the data of the file stored in the file system. As noted above, an object storage system stores each object in a container, and each container is stored within an account. Thus, based on the file matching the one or more policies, a container may be created and/or updated to point directly to a file path and file name. In this manner, an account storage object and/or container storage object may be created or updated in response to a file of the file system matching a policy and an object-based client requesting access to the file. Further still, the object server may locate data of the file that is stored in a file system without using a ring file.

In one embodiment, updating the details of the container includes updating a database such that the database identifies the details of the container. The database may include an index or a list. Further, the database may be an account database, or the database may be a container database. By updating the database, the container details may be returned if a container and/or object listing is requested.

Additionally, at operation 462, the object-based client's request is fulfilled. The request may be fulfilled by providing the object-based client with access to the requested resource. In one embodiment, the request may be fulfilled by providing the object-based client with data of a file in response to the request.

In any of the computed-implemented methods 400, 430, and 450 described within the context of FIGS. 4A, 4B, and 4C, respectively, and the associated systems, an objectified file system may be subsequently de-objectified. De-objectifying the file system may include removing a symbolic link or direct object access to a file. Further, de-objectifying the file system may include removing a listing of the symbolic link or container details from a database, such that an object-based client is no longer able to view an associated object in an object listing. As a result of de-objectifying an object, the data of the object may no longer be accessible to object-based clients. However, the data of the object may remain accessible to file-based clients of the file system.

The systems and computed-implemented methods described herein provide, via an objectification engine, a solution for combining object-based storage and file-based storage while maintaining only a single disk representation of actual data. In this manner, the data in any arbitrary file system may be objectified without actually moving the data of the file system. This may ensure that the same data is accessible to both object-based clients and file-based clients. Further, the same data may be concurrently accessible to both object-based clients and file-based clients via multiple object and file protocols while maintaining the single representation of the data. For example, the same data may be concurrently accessible to file-based clients via network protocols such as SMB and NFS, as well as object-based clients via an object storage API. Moreover, this may be space and resource efficient, as only one physical copy of the data may be required to exist.

Further, the systems and computed-implemented methods described herein may dynamically present context or policy aware content to object-based clients in a manner that is beyond the boundaries of current file systems and/or servers.

Accordingly, the above-described embodiments may present object-based clients with an objectified view of data of an arbitrary file system. The objectified view may abstract the data of the file system that is represented to the object-based clients. In one embodiment, such abstraction may allow the objectified view to be constructed from data of multiple file systems. This may provide clients the ability to traverse file system boundaries by federating multiple files system together, while traditional network attached storage (NAS) clients may be limited to accessing only some of the file systems. Policies may be implemented to limit the access of object-based clients to the files. Further, such policies may consider aspects of multiple file systems being the source of the objectified view(s).

In one embodiment, an objectified view may be created across multiple servers. This may permit the federation of multiple files system into an objectified view for access that crosses server boundaries. Additional rules and policies are conceivable for cross-server federation.

The different approaches on how to construct objectified views and considerations for cross file/object access described above (symbolic links, direct manipulation, static updates, dynamic updates, etc.) may apply to embodiments that traverse file systems and servers as well.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computed-implemented method, comprising:
    identifying a file existing within a non-object namespace of a file system;
    in response to identifying a match between the file and at least one policy, updating details of a container in an object namespace of the file system, where the object namespace of the file system stores object-based representations of files within the file system;
    creating a symbolic link to the file in the object namespace of the file system; and
    updating a database to identify the symbolic link and the details of the container.

2. The computed-implemented method of claim 1, wherein creating the symbolic link to the file in the object namespace of the file system includes creating a representation of an object within the object namespace of the file system, where the representation links to the file.

3. The computed-implemented method of claim 1, further comprising returning the symbolic link in response to a request for the container.

4. The computed-implemented method of claim 1, wherein the database includes a container database.

5. The computed-implemented method of claim 1, further comprising:
   identifying a file attribute of a native file system for the file, the file attribute including a file group identifier; and
   mapping the file group identifier to an account within an object-based access environment.

6. The computed-implemented method of claim 1, wherein the at least one policy evaluates an access control list, a file type of the file, a file size of the file, and a time stamp of the file.

7. The computed-implemented method of claim 1, further comprising identifying the container in response to a client request, utilizing a ring file.

8. A computer program product for objectifying a file system, the computer program product comprising a computer readable storage medium having program instructions embodied therewith, the program instructions executable by a processor to cause the processor to:
   identify, by the processor, a file existing within a non-object namespace of a file system;
   in response to identifying a match between the file and at least one policy, update, by the processor, details of a container in an object namespace of the file system, where the object namespace of the file system stores object-based representations of files within the file system;
   create, by the processor, a symbolic link to the file in the object namespace of the file system; and
   update, by the processor, a database to identify the symbolic link and the details of the container.

9. The computer program product of claim 8, wherein creating the symbolic link to the file in the object namespace of the file system includes creating a representation of an object within the object namespace of the file system, where the representation links to the file.

10. The computer program product of claim 8, wherein the program instructions are further executable by the processor to cause the processor to return, by the processor, the symbolic link in response to a request for the container.

11. The computer program product of claim 8, wherein the database includes a container database.

12. The computer program product of claim 8, wherein the program instructions are further executable by the processor to cause the processor to:
   identify, by the processor, a file attribute of a native file system for the file, the file attribute including a file group identifier; and
   map, by the processor, the file group identifier to an account within an object-based access environment.

13. The computer program product of claim 8, wherein the at least one policy evaluates an access control list, a file type of the file, a file size of the file, and a time stamp of the file.

14. The computer program product of claim 8, wherein the program instructions are further executable by the processor to cause the processor to identify, by the processor, the container in response to a client request, utilizing a ring file.

15. A system, comprising:
   a processor; and
   logic integrated with the processor, executable by the processor, or integrated with and executable by the processor, the logic being configured to:
   identify a file existing within a non-object namespace of a file system;
   in response to identifying a match between the file and at least one policy, update details of a container in an object namespace of the file system, where the object namespace of the file system stores object-based representations of files within the file system;
   create a symbolic link to the file in the object namespace of the file system; and
   update a database to identify the symbolic link and the details of the container.

16. The system of claim 15, wherein creating the symbolic link to the file in the object namespace of the file system includes creating a representation of an object within the object namespace of the file system, where the representation links to the file.

17. The system of claim 15, wherein the logic is further configured to return the symbolic link in response to a request for the container.

18. The system of claim 15, wherein the database includes a container database.

19. The system of claim 15, wherein the logic is further configured to:
   identify a file attribute of a native file system for the file, the file attribute including a file group identifier; and
   map the file group identifier to an account within an object-based access environment.

20. The system of claim 15, wherein the at least one policy evaluates an access control list, a file type of the file, a file size of the file, and a time stamp of the file.

21. A computed-implemented method, comprising:
   analyzing entries of a file system to identify a file, where the file is accessible to a file-based client via a file stack that provides access to the file system using at least one Network-Attached Storage (NAS) protocol;
   checking the file against at least one policy;
   in response to identifying a match between the file and the at least one policy, updating details of a container; and
   creating a symbolic link to the file in an object namespace of the file system to allow access of the file by an object-based client over a network, where a ring file is utilized to identify a location of the symbolic link;
   wherein updating the details of the container includes updating a database such that the database identifies at least one of the created symbolic link and the details of the container.

22. A computer program product for dynamic reference generation, the computer program product comprising a computer readable storage medium having program instructions embodied therewith, the program instructions executable by a processor, to cause the processor to:
   analyze entries of a file system to identify a file, where the file is accessible to a file-based client via a file stack that provides access to the file system using at least one Network-Attached Storage (NAS) protocol;
   check the file against at least one policy;
   in response to identifying a match between the file and the at least one policy, update details of a container; and
   create a symbolic link to the file in an object namespace of the file system to allow access of the file by an object-based client over a network, where a ring file is utilized to identify a location of the symbolic link;

wherein updating the details of the container includes updating a database such that the database identifies at least one of the created symbolic link and the details of the container.

* * * * *